United States Patent
Park et al.

(10) Patent No.: US 7,333,281 B2
(45) Date of Patent: Feb. 19, 2008

(54) METHOD AND APPARATUS TO WRITE AND INSPECT SERVO INFORMATION ON A DISC DRIVE

(75) Inventors: Seung-chul Park, Gyeonggi-do (KR); Kwong-jo Jung, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 292 days.

(21) Appl. No.: 10/644,901

(22) Filed: Aug. 21, 2003

(65) Prior Publication Data
US 2004/0105185 A1  Jun. 3, 2004

(30) Foreign Application Priority Data
Aug. 21, 2002  (KR) ............... 2002-49427

(51) Int. Cl.
*G11B 5/09* (2006.01)
*G11B 27/36* (2006.01)
*G11B 21/02* (2006.01)

(52) U.S. Cl. ............... 360/53; 360/31; 360/75
(58) Field of Classification Search ............ None
See application file for complete search history.

(56) References Cited

U.S. PATENT DOCUMENTS

| | | | |
|---|---|---|---|
| 5,818,654 A * | 10/1998 | Reddy et al. | 360/53 |
| 6,181,500 B1 * | 1/2001 | Serrano et al. | 360/53 |
| 6,295,176 B1 * | 9/2001 | Reddy et al. | 360/48 |
| 6,442,715 B1 * | 8/2002 | Wilson | 714/710 |
| 6,714,369 B2 * | 3/2004 | Miles | 360/51 |
| 6,765,744 B2 * | 7/2004 | Gomez et al. | 360/75 |
| 6,791,778 B2 * | 9/2004 | Chu et al. | 360/53 |
| 2003/0197968 A1 * | 10/2003 | Sacks et al. | 360/75 |

FOREIGN PATENT DOCUMENTS

| | | |
|---|---|---|
| EP | 0 246 705 | 11/1987 |
| EP | 0 479 701 | 4/1992 |
| JP | 1999-80107 | 11/1999 |
| JP | 11-353829 | 12/1999 |
| JP | 2000-268516 | 9/2000 |
| JP | 2002-268516 | 9/2000 |
| JP | 2001-189062 | 7/2001 |
| JP | 2001189062 | 7/2001 |

OTHER PUBLICATIONS

English language Abstract of Japanese Publication No. 2001-189062, published Jul. 2001.

* cited by examiner

Primary Examiner—William R. Korzuch
Assistant Examiner—Daniell L. Negrón
(74) Attorney, Agent, or Firm—Staas & Halsey LLP (57) ABSTRACT

A method and an apparatus to write and inspect servo information on a disc drive and minimize an effect on servo information written in adjacent tracks caused by a gap erase field, and write servo information on the disc drive and perform servo information inspection and defect processing. The method includes sequentially writing servo information toward a track having skew '0' at from outer surface in an outer region of the disc, and sequentially writing the servo information toward the track having skew '0' from an inner surface in an inner region, and after writing of the servo information is completed, inspecting the servo information written in a track at a predetermined distance from the track having skew '0', and determining whether the servo information is correctly written.

18 Claims, 6 Drawing Sheets

METHOD AND APPARATUS TO WRITE AND INSPECT SERVO INFORMATION ON A DISC DRIVE

CROSS-REFERENCE TO RELATED APPLICATIONS

This application claims the priority of Korean Patent Application No. 2002-49427, filed on Aug. 21, 2002, in the Korean Intellectual Property Office, the disclosure of which is incorporated herein by reference.

BACKGROUND OF THE INVENTION

1. Field of the Invention

The present invention relates to a method and an apparatus to control a disc drive, and more particularly, to a method and an apparatus to write and inspect servo information in a disc drive, that minimizes an effect of servo information written in adjacent tracks caused by a gap erase field in a disc drive, and also performs servo information inspection and defect processing.

2. Description of the Related Art

A hard disc drive includes a plurality of magnetic transducers that sense a magnetic field and magnetize a single rotating disc, or each of a plurality of rotating discs, to write and read information, on and from the disc. In general, such information is formatted in a plurality of sectors in circular tracks. There is a number of tracks across each surface of a disc. Corresponding tracks on adjacent discs of the plurality of rotating discs are grouped into cylinders. Therefore, each track is also defined by a cylinder.

In general, each of the transducers is integrated into a slider incorporated into a head gimbal assembly (HGA). Each HGA is attached to an actuator arm. The actuator arm has a voice coil adjacent to a magnetic assembly, together with a voice coil motor. In general, the hard disc drive includes a driving circuit, which supplies current used to excite the voice coil motor, and a controller. The excited voice coil motor rotates the actuator arm and moves each of the transducers across the surfaces of disc(s).

When information is written or read, sometimes the hard disc drive performs a seek routine, where each of the transducers is moved from one track to another track. During the seek routine, the voice coil motor is excited by a current to move each of the transducers to a new position on the surface of a disc. Also, the controller executes a servo routine, in which each of the transducers is moved to a position of a track at a center of the track.

Each of the transducers includes a writer to write data and a reader to read data. In a write mode, as shown in FIGS. 1A and 1B, current flows through a pole 1 and a pole 2 of the writer, such that a magnetic field is created to magnetize the disc.

Figure 1A:
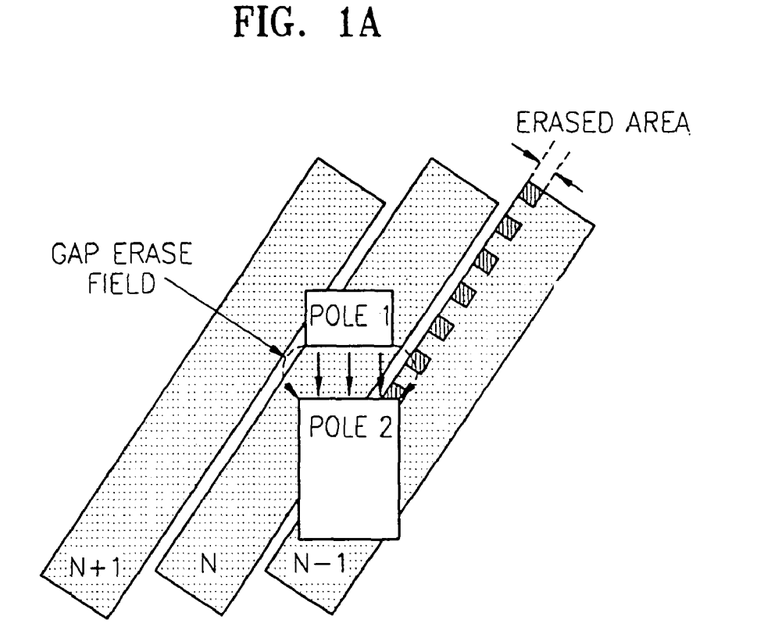
FIGS. 1A and 1B illustrate an effect on a gap erase field of adjacent tracks of a hard disc drive when servo information is written therein.
Figure 1B:
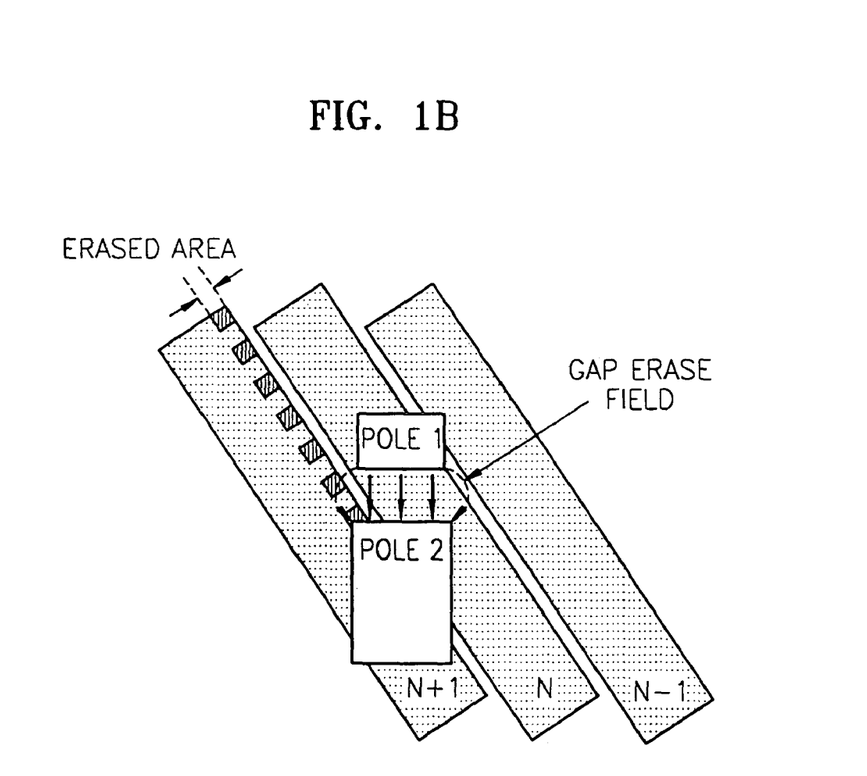

When the magnetic field is created between the pole 1 and the pole 2, as shown in FIGS. 1A and 1B, an undesired gap erase field is also created. As a number of tracks-per-inch (TPI) increases in a high-density writing apparatus, the gap erase field increasingly affects adjacent tracks.

In a general servo track write operation, tracks are written sequentially from 0, the number of a track in an outer portion (OP) of the disc, to the last track in an inner portion (IP). However, as a head (transducer) is placed in the OP, middle portion (MP), or IP, a central axis of the poles 1 and 2 and a track generate positive skew, zero skew, and negative skew, respectively, with respect to a tangent to the track. As shown in FIG. 1B, when servo information is written in an N-th track, moving from the OP toward the track where the skew is '0', the central axis of the poles 1 and 2 generate a positive skew with respect to the N-th track tangent. The gap erase field generated by the positive skew affects an (N+1)-th track. But the servo information is not yet written in the (N+1)-th track, and the servo information will be written in the (N+1)-th track after being written in the N-th track. Thus, from the OP to the track where the skew equals '0', or skew '0', the gap erase field does not affect the servo information in an adjacent field.

But as shown in FIG. 1A, when the central axis of the poles 1 and 2 makes a negative skew with respect to the track tangent, and the magnetic field writes the servo information on the N-th track, the effect of the gap erase field reduces the width of a signal already written in the (N−1)-th field. Thus, the magnitude of a servo signal is reduced in the tracks written after the skew between the axis of the poles 1 and 2 and the track tangent becomes negative. With a reduced magnitude of the servo signal, there is an increased likelihood that the servo signal will be converted into a wrong track value or position error signal (PES) value during an A/D (analog/digital) conversion operation, yielding a result that a normal servo control (seek or following) operation cannot be performed.

To solve these problems, Japanese Patent Publication No. 2001-189062 titled "Disc Memory Apparatus and Servo Data Writing Method", discloses a technique to reduce an effect of an erase width, in which servo information is written in a radial direction from either an inner portion or an outer portion of a disc, and the servo information is written in the radial direction from the of the inner portion and the outer portion.

Figure 6:
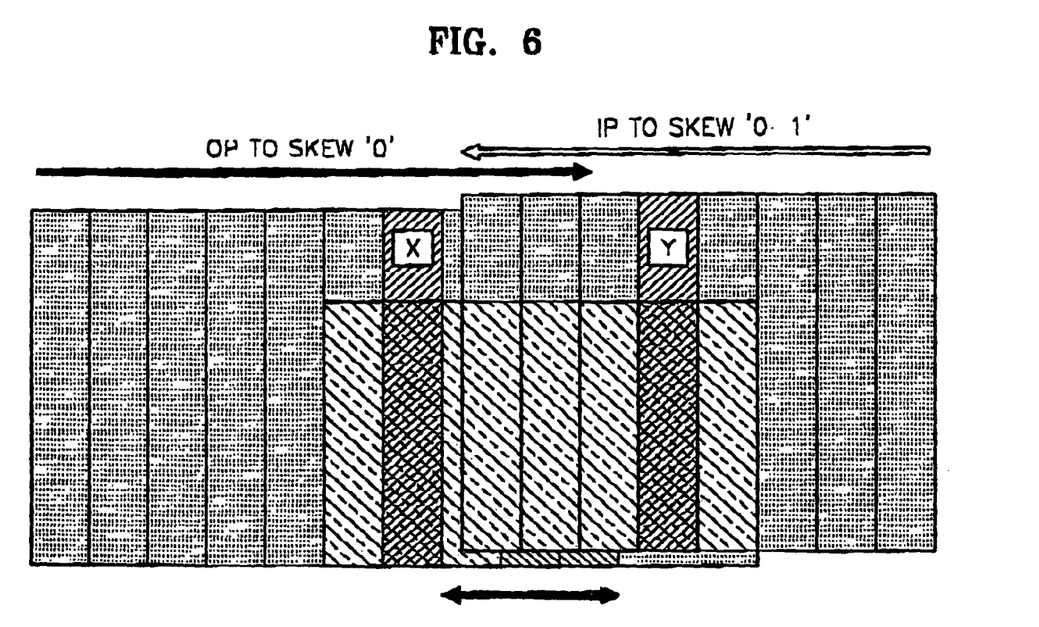
FIG. 6 illustrates a writing state of a track to which the method to write servo information on the disc drive is applied.

However, as shown in FIG. 6, due to limited precision of a servo track writer, servo data are superimposed on a track of an intermediate region, in which a direction of writing servo data is reversed, and the servo data are abnormally written in the superimposed writing region. Also, servo data inspection and track defect processing should be performed in a region in which the servo data are superimposed. However, this technique has not yet been developed, and thus, there is a limitation in applying the technique disclosed in Japanese Patent Publication No. 2001-189062 to a product.

SUMMARY OF THE INVENTION

The present invention provides a method and an apparatus to write and inspect servo information on a disc drive, a defect processing method, and an apparatus thereof, in which, to minimize the effect of skew when servo information is written in a disc drive, after the servo information is written to skew '0' from an outer portion (OP), the servo information is written in an opposite direction to the skew '0' from an inner portion (IP) and servo information inspection and defect processing are performed.

According to an aspect of the present invention, there is provided a method to write servo information on a disc drive. The method comprises centering on a track having skew '0', sequentially writing servo information toward the track having skew '0' from an outer surface in an outer region, and sequentially writing the servo information toward the track having skew '0' from an inner surface in an inner region; and after the writing the servo information is completed, inspecting the servo information written in a track at a predetermined distance from the track having skew '0', and determining whether the servo information is correctly written.

According to another aspect of the present invention, there is provided a method to write servo information in a disc drive. The method comprises sequentially writing servo information from a track having the least number to a track having skew '0'; after writing the servo information to the track having skew '0', moving a head to a track having the largest number; sequentially writing the servo information from the track having the largest number to a track prior to the track having skew '0'; and after writing all the servo information, inspecting the servo information written in a track at a predetermined distance from the track having skew '0', and determining whether the servo information is correctly written.

According to another aspect of the present invention, there is provided a method to write and inspect servo information on a disc drive. The method comprises writing servo information on a track; inspecting the servo information written in the track; if an error occurs in the track, determining whether the number of the track in which the error occurs corresponds to a track at a predetermined distance from a track having skew '0'; if the number of the track in which the error occurs corresponds to the track at the predetermined distance from the track having skew '0', writing the servo information again, and if not, track-defect-processing the track in which the error occurs; and if all tracks have been inspected, track-defect-processing tracks within a predetermined distance from the track having skew '0.

Additional aspects and advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more readily apparent from the following description of the embodiments, taken in conjunction with the accompanying drawings, of which.

DETAILED DESCRIPTION

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
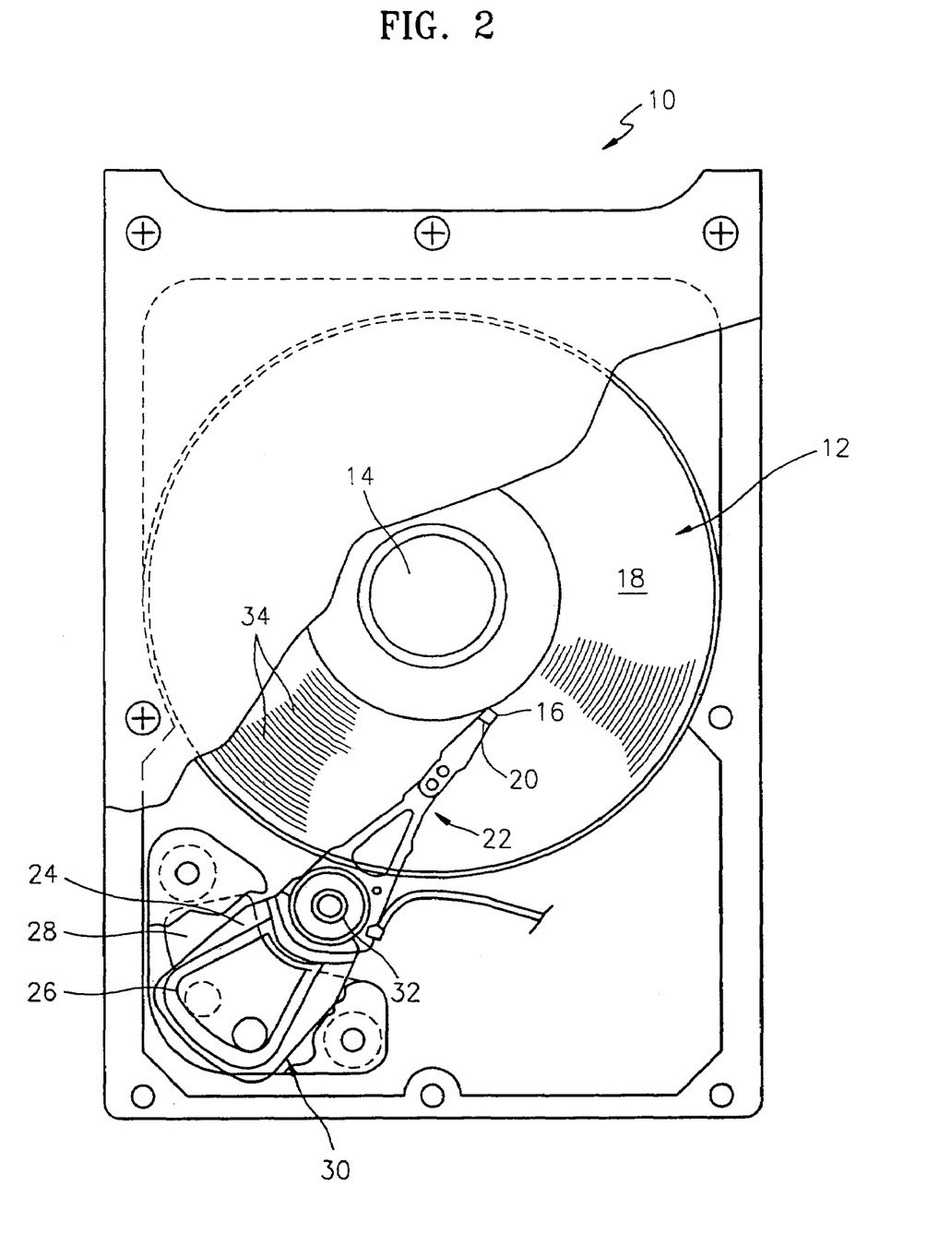
FIG. 2 is a top view of a hard disc drive according to an embodiment of the present invention.

FIG. 2 is a top view of a hard disc drive according to an embodiment of the present invention. A drive 10 has at least one magnetic disc 12 rotated by a spindle motor 14. The drive 10 also has a transducer 16 adjacent to a disc surface 18.

The transducer 16 senses a magnetic field and magnetizes the disc 12 to read and write information, from and on the rotating disc 12. In general, the transducer 16 is coupled with the disc surface 18. Although a single transducer 16 is shown, the transducer 16 includes a writing transducer for magnetizing the disc 12 and a separated reading transducer for sensing the magnetic field of the disc 12. The reading transducer includes a magneto-resistive (MR) device.

According to one aspect, the transducer 16 is integrated into a slider 20. The slider 20 is designed to generate an air bearing between the transducer 16 and the disc surface 18. The slider 20 is coupled with a head gimbal assembly (HGA) 22. The HGA 22 is attached to an actuator arm 24 having a voice coil 26. The voice coil 26 allows a voice coil motor (VCM) 30 to be adjacent to a magnetic assembly 28. Current flowing through the voice coil 26 causes a torque that rotates the actuator arm 24 with respect to a bearing assembly 32. Rotation of the actuator arm 24 causes the transducer 16 to move across the disc surface 18.

In general, information is stored on a circular track 34 of the disc 12. In general, each track 34 includes a plurality of sectors. Each of the sectors includes a data field and an identification field. The identification field has a gray code, used to identify a sector and a track. The transducer 16 is moved across the disc surface 18 to read and write information from and on different tracks. In general, the moving of the transducer 16 across another track is called a seek routine.

Figure 3:
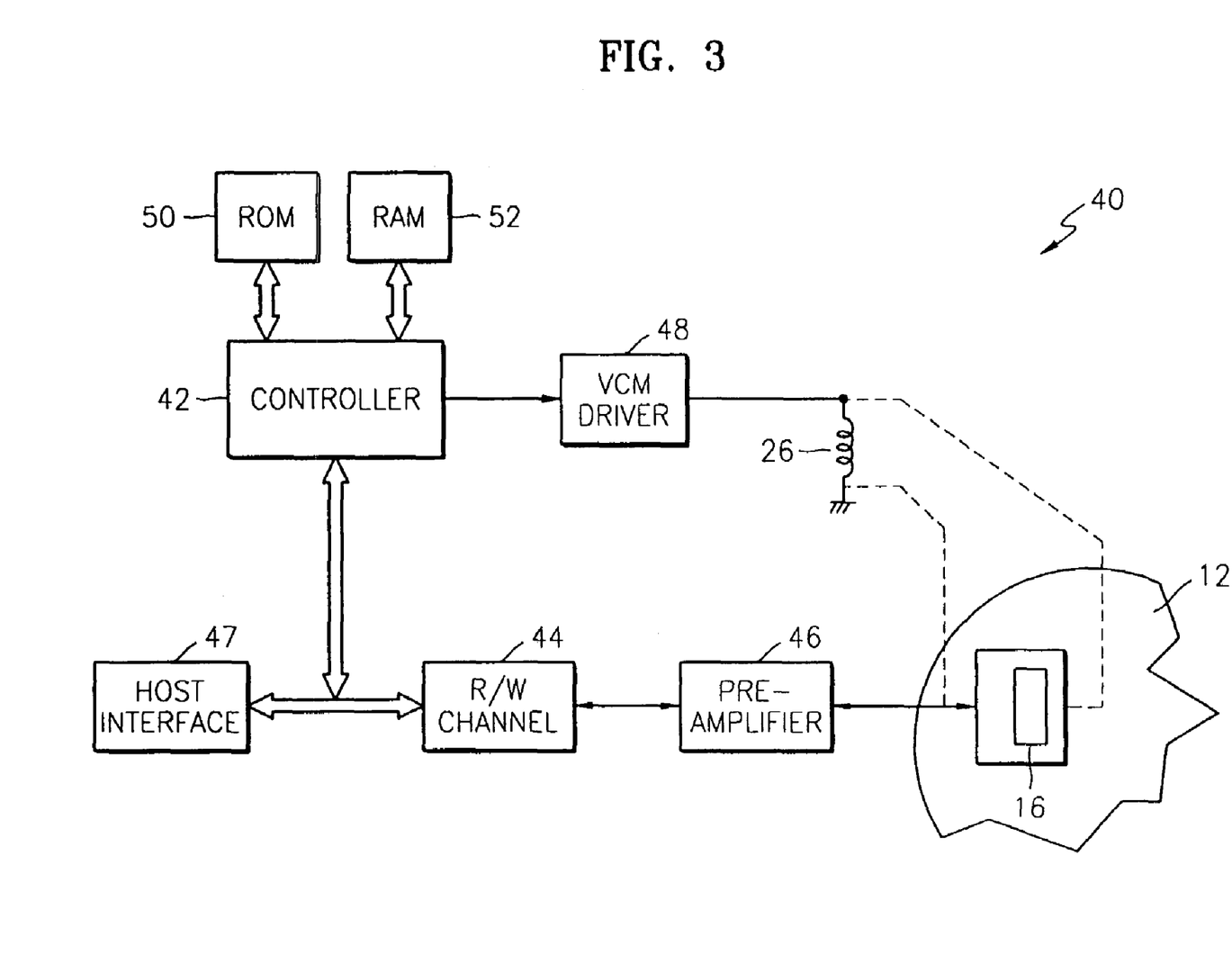
FIG. 3 is a circuit diagram of an electrical system to control the hard disc drive of FIG. 2.

FIG. 3 shows a circuit diagram of an electrical system to control the hard disc drive 10. A system 40 has a read/write (R/W) channel 44 and a controller 42 coupled with the transducer 16 by a pre-amplifier 46. The controller 42 has a digital signal processor (DSP), a microprocessor, and a microcontroller. The controller 42 applies a control signal to the R/W channel 44 to read and write information from and on the disc 12. In general, information is transmitted to a host interface 47 from the R/W channel 44. The host interface 47 includes a buffer memory allowing a disc drive and a control circuit to interface with a system, such as a personal computer (PC).

Also, the controller 42 is coupled with a VCM driver 48, which supplies driving current to the voice coil 26. The controller 42 applies a control signal to the VCM driver 48 to control the excitation of the VCM 30 and the movement of the transducer 16.

In a read mode, the R/W channel 44 converts an analog signal read by the transducer 16 and amplified by the pre-amplifier 46 into a digital signal that can be read by a host computer (not shown), outputs the digital signal to the host interface 47, and receives user data output from the host computer from the host interface 47. And in a write mode, the R/W channel 44 converts the user data into recording current, which can be written on the disc 12, and outputs the recording current to the pre-amplifier 46.

The controller 42 is also coupled with a read only memory or a nonvolatile memory, such as a flash memory 50, and a random access memory 52. The memories 50 and 52 are commanded by the controller 42, to execute a software routine. The software routine includes a seek routine, during which the transducer 16 is moved from one track to another track. The seek routine includes a servo control routine to ensure that the transducer 16 is moved to a correct track.

Figure 4:
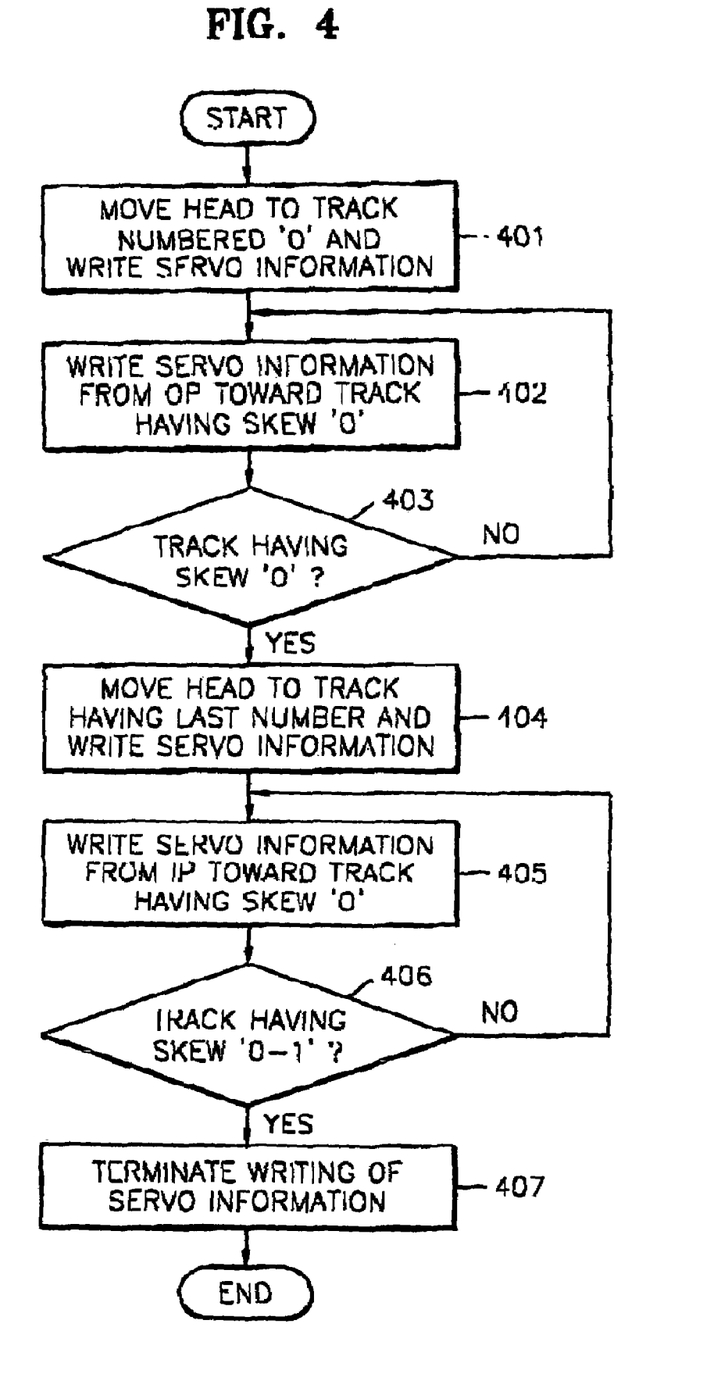
FIG. 4 is a flowchart illustrating a method to write servo information on the disc drive of FIG. 2.
Figure 5:
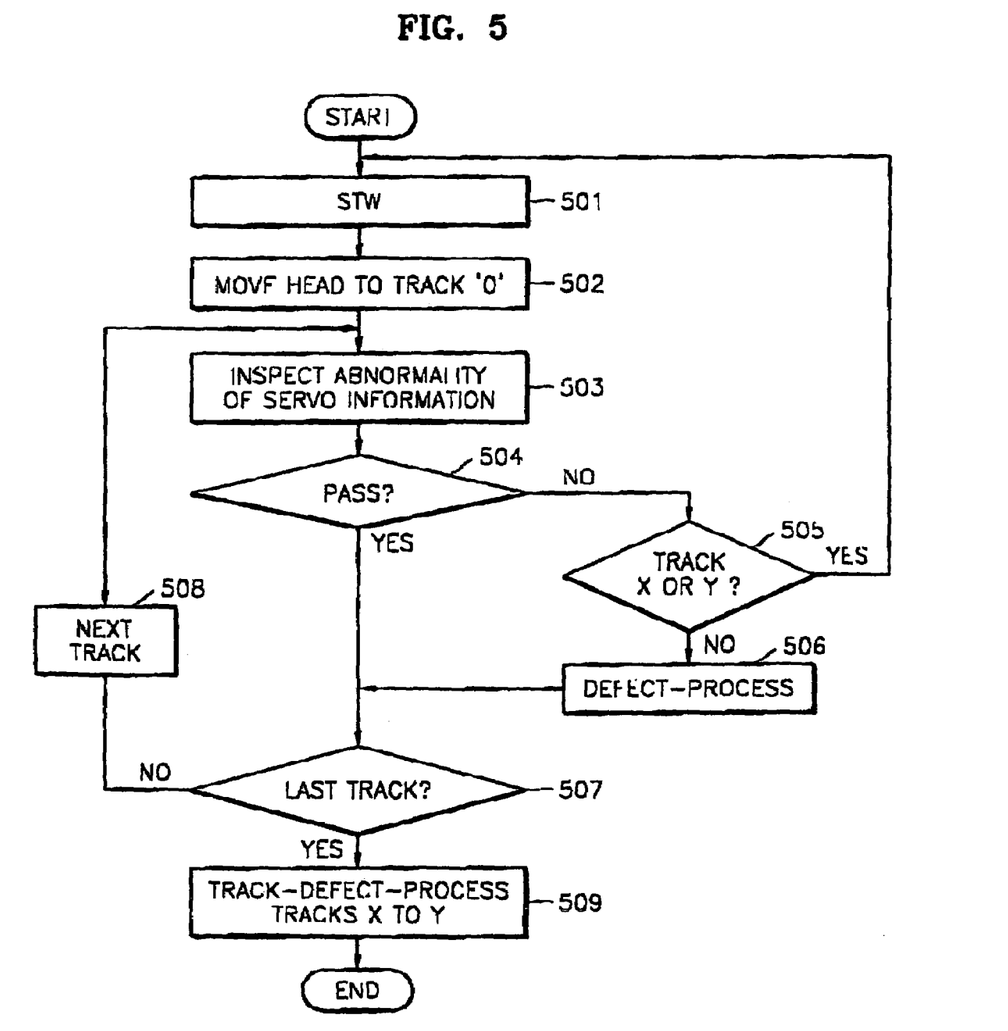
FIG. 5 is a flowchart illustrating a method to write and inspecting servo information on the disc drive of FIG. 2.

Also, computer programs implemented based on the flowchart shown in FIGS. 4 and 5 are stored in the memories 50 and 52.

As a result, the controller 42 controls the transducer 16 to sequentially write servo information toward the track having skew '0' from an outer portion of the disc 12, and to sequentially write servo information toward the track having skew '0' from an inner portion of the disc 12. That is, the controller 42 controls the transducer 16 to sequentially write the servo information from a track having the largest number to a track prior to the track having skew '0', after sequentially writing the servo information from a track having the least number to the track having skew '0'.

In addition, after the servo information is written in the tracks, when the servo information written in the tracks is inspected, if errors occur in tracks at a predetermined distance from the track having skew '0', the controller 42 controls the transducer 16 to perform the servo information writing operation again. If not, the controller 42 controls the transducer 16 to perform defect processing of the tracks in which errors occur, and the tracks within the predetermined distance from the track having skew '0'.

Hereinafter, an embodiment of the method to write servo information on the disc drive will be described with reference to FIG. 4.

When a servo information write mode is executed, in operation 401, the controller 42 controls the VCM 30 to move a head (transducer 16) to a track numbered '0' in the outer portion (OP) of the disc 12. Then servo information is written in the track.

In operation 402, the head is moved to the track with the next greater track number, toward the track having skew '0', and servo information is written in the track.

In operation 403, it is determined whether the current track in which the head is placed has skew '0'. This is to determine whether writing of the servo information is completed from the number '0' of the track in the OD through the track having skew '0'. In other words, it is determined whether the skew of the current track is '0'.

As a result of the determination in operation 403, if the head has not reached the track having skew '0', the method returns to operation 402, in which the head is moved to the track with the next sequentially greater track number, and servo information is written in the track. This loop continues until the skew of the current track reaches '0'.

In operation 404, when the head has reached the track having skew '0', the head is moved to a track having the last number (largest number) at an inner portion (IP) of the disc 12, and servo information is written in that track.

In operation 405, the head is moved to the track with the next lower track number, toward the track having skew '0', and servo information is written in the track.

In operation 406, it is determined whether the current track in which the head is placed has skew '0-1'. This is to determine whether writing of the servo information is completed from the track having the largest number in the IP to the track having skew '0-1'. In other words, it is determined whether the current track is immediately adjacent to the track having skew '0'.

As a result of determination in operation 406, if the head has not reached the track having skew '0-1', the method returns to operation 405, in which the head is moved to the track with the next sequentially lower track number, and servo information is written in the track. This loop continues until the skew of the current track reaches '0-1'.

In operation 407, when the head reaches the track having skew '0-1', the servo information has been written in all tracks, and thus, writing of the servo information is terminated.

According to the above method, after the servo information is sequentially written from the track having the least number to the track having skew '0', the head is moved to the track having the largest number. Then, the servo information is sequentially written from the track having the largest number to a track prior to the track having skew '0'. Thus, the effect on adjacent tracks caused by the gap erase field is minimized.

In the flowchart of FIG. 4, after the servo information is written toward the track having skew '0' from the OP, the servo information is written toward the track having skew '0' from the IP. But alternatively, according to another aspect, after the servo information is written in the direction of the track having skew '0' from the IP, the servo information is written in the direction of the track having skew '0' from the OP.

As described above, centering on the track having skew '0', the servo information is written in opposite directions, such as in the direction of the track having skew '0' from the OP, and in the direction of the track having skew '0' from the IP. As a result, due to limited precision of disc drive control, the servo information written may be superimposed on some tracks, as shown in FIG. 6.

In this way, to prevent decreased quality caused by superimposed writing in the some tracks, a track inspection method shown in FIG. 5 is performed.

Before a track inspection operation, in operation 501, servo information is written in the tracks using the method of FIG. 4.

After writing of the servo information is completed, in operation 502, the head is moved to track number '0'.

In operation 503, an abnormality of the servo information is inspected. In operation 504, it is determined whether gray information, servo sector information, and burst information are normal.

As a result of the inspection in operation 503, if an abnormality is determined in the written servo information in operation 504, then, in operation 505, it is determined whether the track in which the abnormality occurs corresponds to a track X or Y (see FIG. 6) at a predetermined distance from the track having skew '0'. Here, the predetermined distance is determined by considering a precision of the disc drive, and in particular, by considering a precision of a push pin moving the head. As a result of the determination in operation 505, if servo information errors occur in the X or Y track, the servo information is excessively superimposed on the track, and thus, the method returns to operation 501, and servo information is again written using the method of FIG. 4. According to one aspect, this loop continues until either there are no abnormalities in the X or Y track, or the servo information has been written a predetermined number of times.

If the track does not correspond to the track X or Y, in operation 506, the track in which the servo information errors occur is defect-processed.

If, in operation 504, it is determined that there is no abnormality, or after the track is defect-processed in operation 506, then in operation 507, it is determined whether the current track is the last track. If not, the head is moved to the track with the next greater track number in operation 508, and then the method loops back to operation 503.

If, in operation 507, the current track is the last track, then in operation 509, tracks X to Y are track-defect-processed. This is to prevent a case where, if a superimposed region exists, the servo information in the track is nonlinearly increased, and thereby prevent errors occurring between a track position estimated by a servo controller and the current track during a seek operation over a short distance in the superimposed region, such that a normal seek operation cannot be performed. That is, if the seek operation is performed at over a predetermined distance, X and Y tracks at a proper distance are selected and defect-processed, so that there is a reserve time to compensate for errors between an estimated track and the current track.

In this case, if all of the track-defect-processed tracks X to Y exist in the same data zone, difficulties may arise. Thus, it is advisable to place the track having skew '0' at an interface with the data zone, and then the track-defect-processed tracks X to Y are dispersed into two data zones.

In the servo information inspection method according to the present invention, when abnormality occurs in servo information written in a track at a predetermined distance from a track having skew '0', this case corresponds to a case in which a region of a superimposed track exceeds a design standard, and thus, a servo track write operation is again performed. When the abnormality does not occur in the servo information written in the track at the predetermined distance from the track having skew '0, tracks within the predetermined distance from the track having skew '0' are track-defect-processed.

As described above, according to the present invention, centering on the track having skew '0', servo information is written toward the track having skew '0' from an outer portion (IP) of the disc and toward the track having skew '0' from an inner portion (IP) of the disc, so that a gap erase field does not affect adjacent tracks. In addition, a servo information inspection operation is performed, and within a predetermined distance from the track having skew '0' are defect-processed, such that when the servo information is written in the track, interference on adjacent tracks is minimized, seek errors in a region of a track in the vicinity of skew '0' are prevented, and abnormality of the written servo information is correctly determined.

The present invention may be implemented by a method, an apparatus, and a system. When the present invention is implemented with a software unit, elements of the present invention are code segments for performing essential works. Programs or code segments are stored in a processor readable medium or transmitted in response to computer data signals coupled with a carrier wave in a transmission medium or communication networks. The processor readable medium includes a medium on which information can be stored or transmitted. The processor readable medium includes an electronic circuit, a semiconductor memory device, a ROM, a flash memory, an erasable ROM, a floppy disc, an optical disc, and a hard disc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to write servo information on a disc in a disc drive, the method comprising:
   centering on a cylinder of the disc having skew '0', sequentially writing servo information toward the cylinder having skew '0' from an outer surface in an outer region, and sequentially writing the servo information toward the cylinder having skew '0' from an inner surface in an inner region;
   after the writing the servo information is completed, inspecting the servo information written in a cylinder at a predetermined distance from the cylinder having skew '0', and determining whether the servo information is correctly written;
   if errors do not occur in the cylinder at the predetermined distance from the cylinder having skew '0', track-defect-processing all tracks within the predetermined distance from the cylinder having skew '0', such that a normal search operation cannot be performed; and
   if errors occur in the cylinder at the predetermined distance from the cylinder having skew '0', determining that all of the servo information is not correctly written, and writing the servo information for the entire disc again.

2. The method as claimed in claim 1, wherein the cylinder having skew '0' is placed at an interface with a data zone, and the track-defect-processed cylinders within the predetermined distance from the cylinder having skew '0' are dispersed in two data zones.

3. A method to write servo information on a disc in a disc drive, the method comprising:
   sequentially writing servo information from a cylinder of the disc having a least number to a cylinder having skew '0';
   after writing the servo information to the cylinder having skew '0', moving a head to a cylinder having the largest number;
   sequentially writing the servo information from the cylinder having a largest number to a cylinder prior to the cylinder having skew '0';
   after writing all the servo information, inspecting the servo information written in a cylinder at a predetermined distance from the cylinder having skew '0', and determining whether the servo information is correctly written;
   if errors do not occur in the cylinder at the predetermined distance from the cylinder having skew '0', track-defect-processing all tracks within the predetermined distance from the cylinder having skew '0', such that a normal search operation cannot be performed; and
   if errors occur in the cylinder at the predetermined distance from the cylinder having skew '0', determining that all of the servo information is not correctly written, and writing the servo information for the entire disc again.

4. The method as claimed in claim 3, further comprising:
   placing the cylinder having skew '0' at an interface with a data zone, so that the track-defect-processed cylinders within the predetermined distance from the cylinder having skew '0' are dispersed in two data zones.

5. A method to write and inspect servo information on a disc in a disc drive, the method comprising:
   writing servo information on a cylinder of the disc;
   inspecting the servo information written in the cylinder;
   if an error occurs in the cylinder, determining whether the number of the cylinder in which the error occurs corresponds to a cylinder at a predetermined distance from a cylinder having skew '0';
   if the number of the cylinder in which the error occurs corresponds to the cylinder at the predetermined distance from the cylinder having skew '0', determining that all of the servo information is not correctly written and writing the servo information for the entire disc again, and if not, track-defect-processing the cylinder in which the error occurs; and
   if all cylinders have been inspected, track-defect-processing all tracks within the predetermined distance from the cylinder having skew '0', such that a normal search operation cannot be performed.

6. The method as claimed in claim 5, wherein the writing of the servo information comprises:
   centering on the cylinder having skew '0', sequentially writing servo information toward the cylinder having skew '0' from an outer surface in an outer region of the disc; and sequentially writing the servo information toward the cylinder having skew '0' from an inner surface in an inner region of the disc.

7. The method as claimed in claim 5, wherein the writing of the servo information comprises:
sequentially writing the servo information from a cylinder having a least number to the cylinder having skew '0';
after writing the servo information to the cylinder having skew '0', moving a head to a cylinder having a largest number; and
sequentially writing the servo information from the cylinder having the largest number to a cylinder prior to the cylinder having skew '0'.

8. The method as claimed in claim 5, further comprising: placing the cylinder having skew '0' at an interface with a data zone, so that the track-defect-processed cylinders within the predetermined distance from the cylinder having skew '0' are dispersed in two data zones.

9. A disc drive comprising:
a disc having a surface;
a spindle motor that rotates the disc;
a transducer that writes and reads information in and from the disc;
a voice coil motor that moves the transducer;
a controller that controls the transducer to
sequentially write servo information toward a cylinder of the disc having skew '0' from an outer portion of the surface in an outer region of the disc,
sequentially write servo information toward the cylinder having skew '0' from an inner portion of the surface in an inner region of the disc, and
after the writing of the servo information is completed, to inspect the servo information written in a cylinder at a predetermined distance from the cylinder having skew '0' and determining whether the servo information is correctly written; and
a software and a hardware unit that allows the controller to perform
after writing servo information on a cylinder and moving the transducer to a cylinder having a smallest number, a first operation of inspecting the servo information written in the cylinder,
if an error occurs, a second operation of determining whether the number of the cylinder in which the error occurs corresponds to a cylinder at a predetermined distance from the cylinder having skew '0',
if the number of the cylinder in which the errors occur corresponds to the cylinder at the predetermined distance from the cylinder having skew '0', a third operation of determining that all of the servo information is not correctly written and writing the servo information for the entire disc again, and if not, track-defect-processing the cylinder in which the error occurs and moving the transducer to a next cylinder, and repeating the first, second, and third operations, and
if the cylinder in which the servo information in the first operation is inspected corresponds to a cylinder having a largest number, a fourth operation of track-defect-processing all tracks within a predetermined distance from the cylinder having skew '0', such that a normal search operation cannot be performed.

10. The disc drive as claimed in claim 9, wherein:
the cylinder having skew '0' is placed at an interface with a data zone, so that the track-defect-processed cylinders within the predetermined distance from the cylinder having skew '0', are dispersed in two data zones.

11. A method to write servo information on a disc drive including a writing head and a disc with tracks, the method comprising:
defining a skew zero track as the track in which a skew between a tangent to the skew zero track and an axis of the writing head is approximately zero;
writing servo information on sequential tracks in a first radial direction of the disc toward the skew zero track, until servo information is written on the skew zero track;
writing servo information on sequential tracks in a second radial direction of the disc, opposite the first direction, toward the skew zero track, until servo information is written on a track immediately preceding the skew zero track; and
inspecting the servo information to determine if a predetermined tolerance of the writing of the servo information was exceeded, including
inspecting the servo information on each track,
if an abnormality in the servo information is determined on a given track, determining whether the given track is located at a predetermined distance from the skew zero track;
if the given track is not located at the predetermined distance from the skew zero track, track-defect-processing the given track,
if the given track is located at the predetermined distance from the skew zero track, rewriting all of the servo information, and inspecting the servo information again, and
once all tracks are inspected and no abnormality is found on the track at the predetermined distance from the skew zero track, track-defect-processing all tracks within the predetermined distance from the skew zero track, such that a normal search operation cannot be performed.

12. The method according to claim 11, further comprising:
defining an interface of two data zones at the skew zero track, thus distributing the track-defect processed tracks within the predetermined distance from the skew zero track in the two data zones.

13. A method to write servo information on a disc drive including a writing head and a disc with tracks, the method comprising:
defining a skew zero track as the track in which a skew between a tangent to the skew zero track and an axis of the writing head is approximately zero;
writing servo information on sequential tracks in a first radial direction of the disc toward the skew zero track, until servo information is written on the skew zero track;
writing servo information on sequential tracks in a second radial direction of the disc, opposite the first direction, toward the skew zero track, until servo information is written on a track immediately preceding the skew zero track; and
inspecting the servo information to determine if a predetermined tolerance of the writing of the servo information was exceeded, including
inspecting the servo information on a given track located at a predetermined distance from the skew zero track,
if an abnormality in the servo information is determined on the given track, rewriting all of the servo information, and inspecting the servo information on the given track again, repeating the inspecting and rewriting until one of no abnormality is found in the given track, or the servo information has been written a predetermined number of times, and if no abnormality is found on the given track, track-defect-processing all tracks within the predetermined distance from the skew zero track, such that a normal search operation cannot be performed.

14. The method according to claim 13, further comprising:

defining an interface of two data zones at the skew zero track, thus distributing the track-defect-processed tracks within the predetermined distance from the skew zero track in the two data zones.

15. A disc drive, comprising:

a reading and writing head;

a disc; and a controller, controlling the reading and writing head to
write servo information on sequential tracks in a first radial direction of the disc toward a skew zero track until servo information is written on the skew zero track;

write servo information on sequential tracks in a second radial direction of the disc, opposite the first direction, toward the skew zero track, until servo information is written on a track immediately preceding the skew zero track, and inspect the servo information to determine if the predetermined tolerance of the writing of the servo information was exceeded, wherein the skew zero track is defined as the track in which a skew between a tangent to the skew zero track and an axis of the reading and writing head is approximately zero, and wherein controlling the reading and writing head to inspect the servo information to determine if the predetermined tolerance of the writing of the servo information was exceeded includes controlling the reading and writing head to
inspect the servo information on each track;

if an abnormality in the servo information is determined on a given track, determine whether the given track is located at a predetermined distance from the skew zero track;

if the given track is not located at the predetermined distance from the skew zero track, track-defect-process the given track;

if the given track is located at the predetermined distance from the skew zero track, rewrite all of the servo information, and inspect the servo information again, and once all tracks are inspected, track-defect-process all tracks within the predetermined distance from the skew zero track, such that a normal search operation cannot be performed.

16. The disc drive according to claim 15, wherein an interface of two data zones is defined at the skew zero track, thus distributing the track-defect-processed tracks within the predetermined distance from the skew zero track in the two data zones.

17. A tangible computer readable medium, comprising;

a first set of instructions to define a skew zero track as a track of a disc in which a skew between a tangent to the skew zero track and an axis of a writing head is approximately zero;

a second set of instructions to write servo information on sequential tracks in a first radial direction of the disc toward the skew zero track until servo information is written on the skew zero track;

a third set of instructions to write servo information on sequential tracks in a second radial direction of the disc, opposite the first direction, toward the skew zero track, until servo information is written on a track immediately preceding the skew zero track a fourth set of instructions to inspect the servo information to determine if the predetermined tolerance of the writing of the servo information was exceeded, wherein the fourth set of instructions includes a fifth set of instructions to inspect servo information on each track;

a sixth set of instructions, that, if an abnormality in the servo information is determined on a given track, determines whether the given track is located at a predetermined distance from the skew zero track;

a seventh set of instructions, that, if the given track is not located at the predetermined distance from the skew zero track, track-defect-processes the given track;

an eighth set of instructions, that, if the given track is located at the predetermined distance from the skew zero track, rewrites all of the servo information, and inspects the servo information again; and a ninth set of instructions, that once all tracks are inspected, track-defect-processes all tracks within the predetermined distance from the skew zero track, such that a normal search operation cannot be performed.

18. The tangible computer readable medium according to claim 17, further comprising:

a tenth set of instructions to define an interface of two data zones at the skew zero track, thus distributing the track-defect-processed tracks within the predetermined distance from the skew zero track in the two data zones.

* * * * *

UNITED STATES PATENT AND TRADEMARK OFFICE
CERTIFICATE OF CORRECTION

| | | |
|---|---|---|
| PATENT NO. | : 7,333,281 B2 | Page 1 of 1 |
| APPLICATION NO. | : 10/644901 | |
| DATED | : February 19, 2008 | |
| INVENTOR(S) | : Seung-chul Park et al. | |

It is certified that error appears in the above-identified patent and that said Letters Patent is hereby corrected as shown below:

Column 10, Line 40, change "track-defect processed" to --track-defect-processed--.

Column 12, Line 6, change "comprising;" to --comprising:--.

Signed and Sealed this
Thirty-first Day of May, 2011

David J. Kappos
*Director of the United States Patent and Trademark Office*